July 7, 1953

H. G. DE FRANCE
SYSTEM FOR THE ELECTROMAGNETIC
SPOTTING OF MOVABLE TARGETS

Filed Nov. 26, 1948

INVENTOR
HENRI GEORGES DE FRANCE
BY
Bailey, Stephens & Huettig
ATTORNEYS

July 7, 1953     H. G. DE FRANCE     2,644,940
SYSTEM FOR THE ELECTROMAGNETIC
SPOTTING OF MOVABLE TARGETS
Filed Nov. 26, 1948                         4 Sheets-Sheet 2

INVENTOR
HENRI GEORGES DE FRANCE
BY
Bailey, Stephens & Huettig
ATTORNEYS

INVENTOR
HENRI GEORGES de FRANCE

INVENTOR
HENRI GEORGES de FRANCE
BY
ATTORNEYS

Patented July 7, 1953

2,644,940

UNITED STATES PATENT OFFICE 2,644,940

SYSTEM FOR THE ELECTROMAGNETIC SPOTTING OF MOVABLE TARGETS

Henri Georges de France, Paris, France, assignor to Society "La Radio-Industrie," S. A., Paris, France, a society of France Application November 26, 1948, Serial No. 61,996
In France November 26, 1947

3 Claims. (Cl. 343—7.3)

1

The present invention relates to systems for the electromagnetic spotting and automatic tracking of a movable target, in particular through the transmission of pulses and reception of echo pulses (radars), especially when it is desired, for instance on board an aircraft or other machine of this kind, to locate another aircraft or movable body, in order to open fire thereon or for any other purpose, it being understood that indication of this application is not in any way limitative and that my invention could also be used on ground or on sea.

Its object is to provide a system of this kind which is better adapted to meet the requirements of practice than those existing at this time, in particular from the point of view of automaticity and accuracy.

Preferred embodiments of my invention will be hereinafter described with reference to the accompanying drawings, given merely by way of example, and in which.

Figure 1:
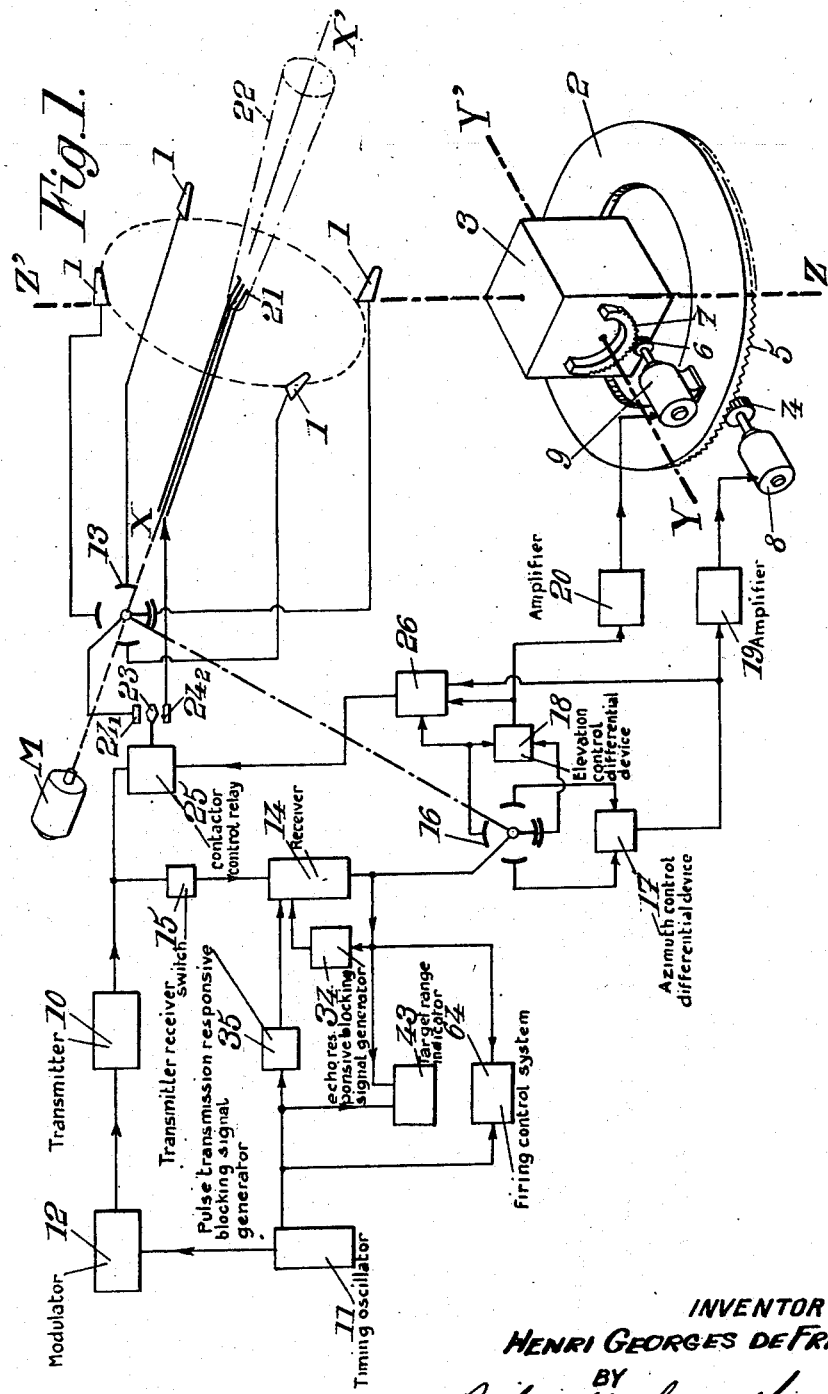
Fig. 1 is a diagram, partly in perspective, of a system for spotting a target and automatically tracking it, especially on board an aircraft, according to my invention.

The invention will be supposed to be applied to a device provided on board an airplane for spotting and automatically tracking a target which is also movable (for instance in particular another airplane, a rocket, etc.) more especially with a view to controlling the laying and firing of a gun carried by said airplane.

It should be reminded that there exist, especially on the ground, radar systems, that is to say electromagnetic location systems working by transmission of pulses, which permit of following a movable target with a high accuracy as to azimuth, elevation and range, this following action generally taking place after a look-out period during which the radiating beam transmitted from the system scans the whole space, in order first to find the direction of the target. The operations performed by such system are in particular, up to the present time, carried out in the following manner.

2

The radar system includes for instance, according to known arrangements, an aerial giving a radiating lobe of a given aperture, for instance averaging 3 degrees. For spotting operation this beam is swept through the whole space with a helical motion, which can be decomposed into an azimuth rotation movement at the rate of some revolutions per minute and an elevation movement the angular velocity of which substantially averages the aperture of the radiating lobe per azimuth revolution period. This elevation movement is in fact sometimes limited, for instance to 10 degrees above the horizon and 30 degrees below it. Representation of the targets is effected on a panoramic oscilloscope on which the echo pulses corresponding to the target are visible and permit of reading the range, with a precision which, as a matter of fact, is limited by the dimensions of said oscilloscope.

In these known systems, as soon as the target has been spotted, the aerial is set in the direction thereof and automatic tracking begins. This tracking is obtained, in particular, by causing the axis of the radiating lobe to revolve at high speed about a mean geometrical axis with which it makes a small angle, for instance one degree. Comparison of the receptions obtained for different positions of the radiating lobe, in particular on the right and on the left, on the one hand, and above and below, on the other hand, permits of automatically controlling the motors provided for laying the aerial in direction. It should be noted that, anyway, manual control is to be performed to switch from spotting operation to automatic tracking operation.

Now, according to my invention, I provide a system, more especially for use on board of an airplane, which works in two successive steps, with an automatic switching from one to the other, to wit:

A first step during which the target is stopped and automatically tracked by means of a first tracking unit including a space scanning directional antenna array and means responsive to electro-magnetic signals received by said antenna array from said target for automatically laying said antenna array on said target and keeping it laid thereon;

And a second step which goes on with the automatic tracking as above started, but with the use of an aerial ensuring a higher accuracy owing to a smaller aperture, switching from the first aerial to the second one taking place automatically as soon as the general axis of the first one is directed toward the target.

It is of interest to mount both aerials on the same frame, i. e. on the frame of the laying apparatus intended to control firing, which apparatus will be, for instance, carried either by the gun the firing of which is to be controlled, or by the airplane when the gun is fixed with respect thereto (in which case the apparatus will be intended to cooperate with the airplane controls). It is even advantageous, as hereinafter set forth, to have both aerials arranged in such manner as to define the same geometrical axis.

Concerning first the first aerial array, it may be constituted, for instance:

Either, as shown by Fig. 1, by a multiplicity of radiating elements producing radiation lobes of suitable aperture (for instance 45°) and having their axes slightly inclined with respect to a mean axis XX', for instance in such manner as to overlap one another by about 15°, said elements being in particular four in number (two on right and left for azimuth adjustment, and two above and below for elevation adjustment) and being advantageously constituted by dielectric antennas 1, or alternately by horn or wave guide openings, Or by a single radiating element (dipole, etc.), driven by a continuous rotation movement about geometrical axis XX' in such manner that the axis of the radiation lobe describes about this axis XX' a cone of suitable aperture (an arrangement which will be adopted hereinafter for the high accuracy aerial).

Such an aerial array is carried by the laying apparatus diagrammatically shown at 2, 3 and essentially constituted by two movable frame elements, one 2 having an azimuth displacement (through pinion 4 and gear wheel 5 which ensure pivoting about a vertical axis Z'—Z') the other with an elevation displacement (through pinion 6 and sector 7 ensuring rotation about a horizontal axis Y—Y'), and such a system can then perform both spotting in the cone defined by antenna elements 1, and automatic tracking. It suffices to have recourse, to ensure laying of axis X—X' in the direction of the target, to comparator means such as above referred to, said means controlling, in accordance with the intensity of reception in four suitable radiation lobes (two for the azimuth and two for the elevation), motors such as 8, 9 acting on elements 2, 3.

According to the arrangement shown, the radiating aerial elements 1 used for instance both for transmission and reception, according to known methods, are fed successively, from a transmitter 10, controlled by a timing oscillator 11 (which delivers pulses at a suitable rate corresponding to that used in radar systems) and a modulator 12, a switch 13 being interposed for ensuring the successive switching in of said elements, which switch is driven by motor M at a suitable speed.

The echo pulses are received in receiver 14, through said switch 13 and the usual transmitter-receiver switch 15.

The comparator means for automatically ensuring the laying of axis XX' on the target (automatic tracking) through antenna array 1 include for instance a second switch 16 driven in synchronism with the first one and adapted to coact with differential control devices 17, 18 (in particular of the type hereinafter described), which themselves respectively control the laying motors 8, 9, with amplification at 19, 20. Switches 13, 16, shown separate on Fig. 1, for the sake of clarity of the drawing, can be mounted on the same axis and driven by the same motor M.

As long as differential device 17, which controls the azimuth laying of antenna array 1, receives in the two corresponding radiation lobes (elemens 1 on the right and on the left), through switch 13, receiver 14 and switch 16, echo pulses of different respective intensities, said system supplies a current which operates the corresponding motor 8. The current drops to zero and the motor stops when reception is equal in both lobes, which means that azimuth laying is ensured. The operation is the same for elevation laying through differential system 18 which corresponds with the two upper and lower elements 1. When both motors 8 and 9 tend to stop, axis XX' is laid toward the target and automatic tracking begins.

The second of the above specified steps now begins so as to ensure this automatic tracking no longer by means of antenna array 1 but of a high accuracy aerial, i. e. one giving radiation lobes of smaller aperture and having its axis little inclined with respect to axis XX'.

This high accuracy aerial is advantageously constituted by a single element rotating about axis XX', for instance a dipole 21, the radiation lobe of which, of an aperture of for instance approximately three degrees, has its axis little inclined with respect to said axis XX', whereby a radiating cone 22 of small aperture is obtained.

The rotary movement of this aerial 21, supposed to be mounted on the same frame as aerial elements 1 (i. e. on the frame element 3 of the laying apparatus), will be advantageously obtained from the above mentioned motor M (possibly at a speed which is a multiple or a sub-multiple of that above considered), which motor can therefore be mounted on the same frame as the two switches, although this is not necessary.

Supposing that the same transmitter 10 cooperates with both of the aerial systems, automatic tracking, started on array 1, can be pursued on the high accuracy aerial 21 through the same parts, provided a suitable switching is performed, which switching is supposed to be ensured, in this example, by means of a contactor 23 (all the circuits being shown on the drawings as being unipolar or unifilar for the sake of simplicity) having two positions $24_1$, $24_2$ corresponding to the two aerials. For position $24_1$, contact is established successively with the array formed by the four elements 1, fixed with respect to frame element 3, through switch 13, whereas, in position $24_2$, contact is established in a continuous manner with the high accuracy aerial 21 which rotates with respect to said frame element 3. Contactor 23 is controlled by a relay 25.

In order to ensure the operation of contactor 23 or of its relay, I make use of a selector device 26 which automatically operates when the laying of axis XX' on the target has been ensured by means of the antenna array 1, this device being therefore suitably arranged and connected to differential devices 17, 18, so as to operate when these last mentioned devices are both fed with echo pulses and balanced under the action of these pulses.

According to an advantageous embodiment hereinafter described, differential devices 17, 18 are supposed to be of the kind described in a patent application filed in United States of America under Ser. No. 677,392, on June 17, 1946, by Mr. Henri de France for: "Improvements to Apparatus for Determining a Direction," now Patent Number 2,513,849, but it should be understood that other means might to used for the same purpose.

Figure 2:
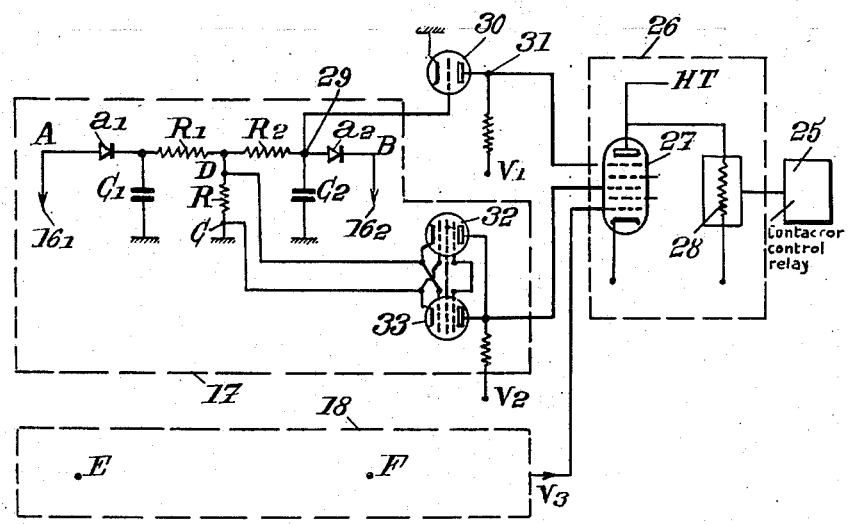
Fig. 2 is a diagram of a portion of this system.

According to this embodiment, more particularly visible on Fig. 2, the azimuth control differential device 17, the input terminals of which, visible at A, B, are respectively connected to the end contacts $16_1$, $16_2$ of switch 16 (those which ensure successive switching with the two right and left elements), essentially includes a kind of bridge with resistances R, $R_1$, $R_2$, condensers $C_1$, $C_2$ and two rectifiers $a_1$, $a_2$ acting in such manner that reception of the echo pulses at A causes a current to flow in a given direction through resistance R and reception of the echo impulses at B causes current to flow therethrough in the opposite direction, whereby a positive or negative voltage will be produced across the terminals CD of resistance R according as the axis of antenna array 1 is on one side or the other of the position corresponding to the azimuth laying on the target. It is this voltage which is used to control the azimuth laying motor 8 and also to control selector 26.

The elevation control differential device 18 is similarly made and its wiring diagram has not been shown on Fig. 2.

Being given this system, I constitute the above mentioned selector 26 by a sensitive element such as a multigrid tube 27 (Fig. 2) subjected to the action of three voltages $V_1$, $V_2$, $V_3$ corresponding respectively:

to the existence of echo pulses,
to the balancing of azimuth differential device 17,
to the balancing of elevation differential device 18, said tube being for instance such that it supplies current at its output, at 28, toward the relay 25 which controls contactor 23 (Fig. 1) only when these three voltages exist simultaneously.

For the obtainment of voltage $V_1$, it is noted that at a point such as 29 of differential device 17, the voltage is for instance negative if echo pulses are received. This voltage, applied to a triode such as 30, blocks this tube, so that, at its output at 31, said voltage $V_1$ appears. On the contrary, in the absence of current in the differential device, that is to say if no pulses are received, tube 30 delivers current and the voltage is lower than $V_1$.

For the obtainment of $V_2$ or $V_3$, I make use in each differential device of two tubes such as 32, 33, for instance of the pentode type, adjusted in such manner that they are blocked in the absence of voltage on their control grids. As long as the differential device is not in the balanced state, there is a voltage between C and D, whereby one of the tubes supplies current and, consequently, the output voltage is lowered. On the contrary, as soon as balanced state exists, the tubes are blocked and the output voltage becomes equal to $V_2$ (for device 17) or $V_3$ (for device 18).

As for the selector tube, it will be for instance of the pentagrid type, the control voltages $V_1$, $V_2$, $V_3$ being applied to the suppressor and control grids. The cathode is brought to a potential approximating $V_1$. The potentials of the other electrodes are adjusted in such manner that the tube delivers current when the grids acted upon are at the same potential as the cathode and is blocked when one of said grids becomes negative with respect to the cathode.

It follows that a current or a voltage is produced at 28 only when there is simultaneously a balancing of the two differential devices and a current flow in one branch of one of them. This current or this voltage operates relay 25 and contactor 23.

At this time, automatic tracking takes place automatically and goes on on the high accuracy aerial.

Of course, selection might take place in any other way. It might act on the transmitters if one transmitter is provided for the low accuracy aerial and another for the high accuracy aerial.

Anyway it is possible to control firing in a very accurate manner since the momentaneous direction of the target is obtained with a very small error and automatically. The range marking devices and other correcting devices, in particular in order to take into account the speed of the target, will be combined with the laying apparatus, as usual. It should be understood that the invention applies particularly well to the detection of target at relatively small ranges, averaging for instance five kilometers, or to the firing of high velocity firearms, but would extend also to other applications, according to the aperture of the cone of the look-out aerial.

According to another feature of my invention, I provide means for making it possible, when control of the direction has been started by means of the first echo pulse coming from a given target, that is to say, in fact, from the nearest target, to eliminate the action of all echo pulses coming from other targets.

These means will consist most generally in a device capable of producing, under the effect of the first echo pulse, a blocking signal of suitable length which, applied to the receiver, prevents action of the possible subsequent pulses.

I may utilize, in particular, relaxation or other systems, of the kind used for starting the scanning of frames or lines in television, or of the kind hereinafter described for the elimination of the echo pulses from projectiles.

The device in question is diagrammatically illustrated at 34, in Fig. 1. At its input, it receives from receiver 14 the echo pulses, whereas, at its output, it transmits to said receiver the desired blocking signal. Such a device may be provided either merely in combination with the lookout aerial 1, or in combination with both this aerial and the high accuracy aerial 21.

According to another feature, I provide means, preferably in combination only with the high accuracy aerial for preventing the action on the receiver of the echo pulses coming from the projectiles fired and still located at a short distance from the laying apparatus.

In order to constitute said means, as diagrammatically illustrated at 35 on Fig. 1, the transmitted pulses are caused to produce very short blocking signals, for instance of a duration of two microseconds if it is desired to neutralize the echo pulses from projectiles fired and located at a distance of less than 300 meters. It seems that this is a suitable distance, because the echos from projectiles located at a greater distance become too weak to create a disturbance, but of course said distance can be determined for the best possible result in every case.

Besides, if it were desired wholly to eliminate the action of the echo pulses, even when they are weak, I might further provide means capable, when the projectiles are fired, of ensuring, through a suitable switching at the receiver, or in any other way, the rubbing out of weak echos, so as to allow only the target echo to pass.

Figure 3:
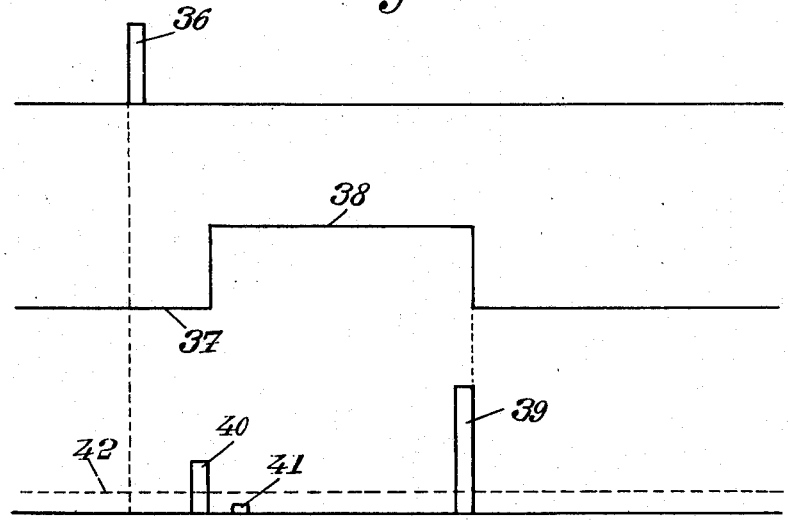
Fig. 3 shows several waveforms relating to the elimination, in the receiver, of the echo pulses from projectiles.

The operation of such a device is illustrated by the diagrammatic view of Fig. 3, which shows:

At 36, a transmitted pulse of 0.3 microsecond for instance,

At 37, 38, the blocking signal (of a duration equal to two microseconds, in this case) and the release signal (which occurs immediately after the blocking signal and lasts until the first echo pulse 39 from the target is received, which again exerts a blocking action through device 34), And at 40, 41, two echo pulses from the projectile, one 40 coming from a projectile located at a distance of less than 300 meters and which is eliminated by the blocking signal 37, the other 41 coming from a projectile located at a distance of more than 300 meters, and which is without influence upon the receiver because it is sufficiently weak to be located below the rub out level 42.

It should be noted that, on this diagram, the proportions of the echo pulses are not exact, as the echo pulse 39 from the target is much greater than pulses 40 and 41.

The release signal 38, which will be for instance transmitted with a delay of two microseconds after the transmitted pulse 36, can be obtained through any suitable means, for instance through a delay artificial line device, through phase shifting multivibrator systems, etc.

Figure 4:
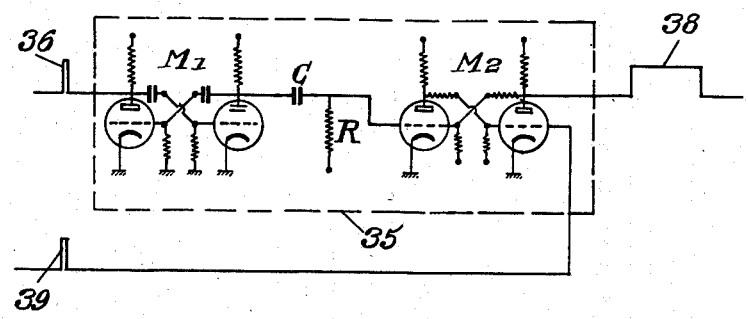
Fig. 4 is a diagram of a device for achieving this elimination.
Figure 5:
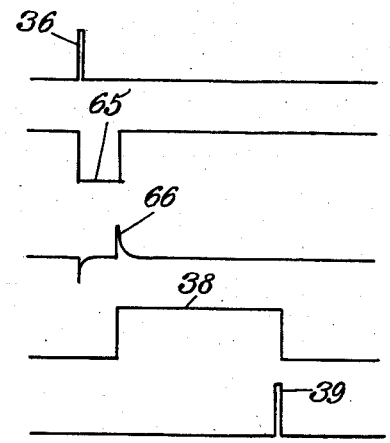
Fig. 5 shows various waveforms illustrating the working of this device.

Fig. 4 shows a system which can be used for this purpose and which includes:

A first multivibrator M₁, of a conventional type, acting as a phase shifter, this multivibrator receiving a transmission pulse 36 to give at the output a signal such as 65 (Fig. 5) transformed in a device C, R into another stiff front signal 66 having the delay in question, And a second multivibrator M₂ of the rocking type, supplying the release signal 38, under the combined action of signal 66 and the first echo pulse 39 (Fig. 5).

If devices 34 and 35 are used simultaneously, signal 38 would be advantageously supplied by a single multivibrator of the rocking type influenced on the one hand by the pulse supplied from device 34 and on the other hand by the first echo pulse 39.

According to still another feature of my invention, means are provided, in particular to permit of preparing firing, for automatically measuring the range of the target, which means supply indications more accurate than those that can be obtained by observing the usual panoramic apparatus.

These means are for instance arranged in such manner as to supply, through a suitable system, during the time elapsing between the initial pulse and the first echo pulse, a constant current, the amount of electricity thus delivered being measured or made visible in any suitable manner to indicate the desired distance.

By way of indication, I make use for instance of a system of the multivibrator type, which is triggered into action by the initial pulse and restored to initial state by the incoming pulse. During this interval, an element of the system delivers for instance a constant current which, spread over the period of repetition of the pulses, will give a mean current proportional to the range. Or again, during this interval, a condenser is charged proportionally to the time elapsed, and the crest voltage of this condenser will measure the range. Any other analogous means can be used for the same purpose.

In Fig. 1 there is shown a system making use of the charge of a condenser.

Figure 6:
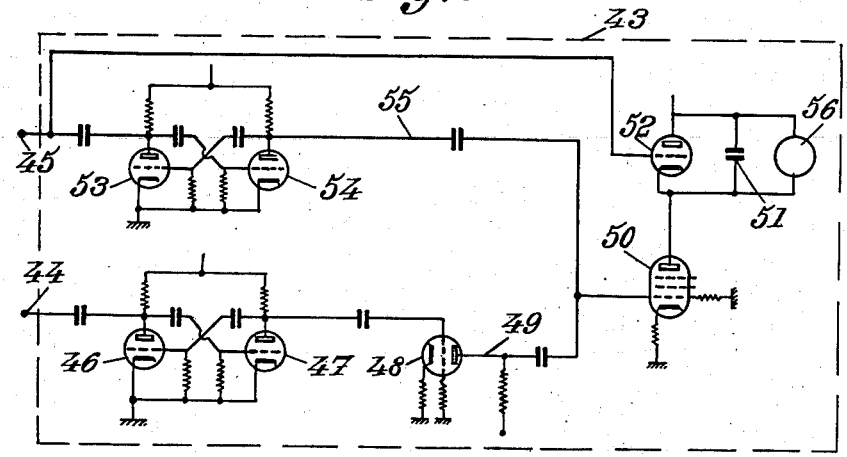
Fig. 6 is a diagram showing a device for measuring the range of the target according to my invention.

Such a system, which is inserted at 43 (Fig. 1) between transmitter and receiver, to receive both at 44 (Fig. 6) the pulse from the transmitter and at 45 (Fig. 6) the echo pulse from the receiver, includes for instance:

A multivibrator, in particular including two tubes 46, 47, or another trigger apparatus, adapted to be triggered by the transmitted pulse and to supply a phase inverter tube 48 with a negative signal which is given back by this tube in the form of a positive signal, at 49, A tube 50, capable of charging a condenser 51, according to a substantially linear law, A discharge tube or analogous 52, capable of discharging said condenser, under the effect of the echo pulse applied to the grid of this tube 52, And, in order to prevent the charging of the condenser from starting again immediately, but to cause it to begin again only when the next pulse is sent from the transmitter, another multivibrator 53, 54, adapted to be triggered into action by the echo pulse and to apply at its output at 55 a negative signal to the grid of tube 50.

The two conventional multivibrators 46, 47 and 53, 54 might be replaced by a single multivibrator of the rocking type with a double control (44 on one tube, 45 on the other).

The working of this device is obvious. It will be seen that the crest voltage of the condenser, registered through any suitable apparatus 56 or read on this apparatus, represents the range of the target. This voltage may be utilized in any apparatus serving to prepare or to start firing (elevating mechanism, target speed correction means, deflection marking means, etc.).

Figure 7:
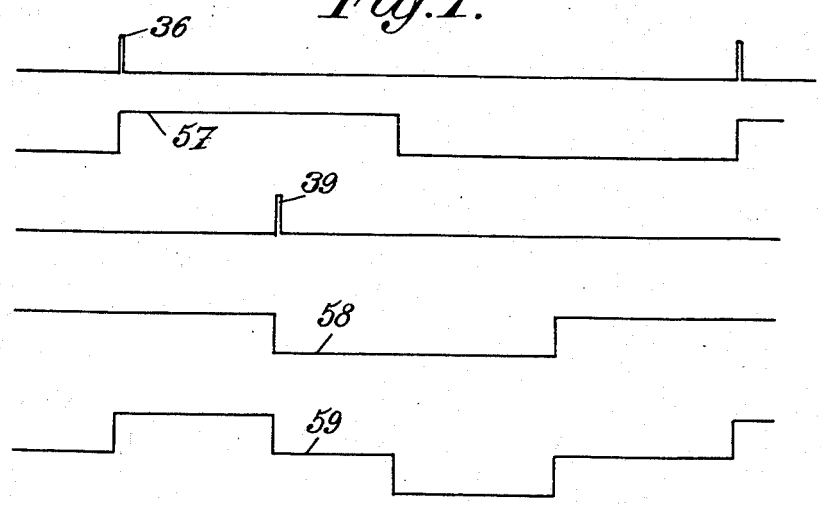
Fig. 7 shows various waveforms illustrating the working of said device.

Fig. 7 illustrates the various signals produced, to wit:

the transmitted pulse 36, signal 57, in this case a positive one, supplied at 49, the echo pulse 39, signal 58, in this case a negative one, supplied at 54, and the composite voltage 59 which acts upon tube 50, which voltage contributes in charging condenser 51, so as to obtain the crest value which represents the range to be obtained.

Finally, according to another feature of my invention, which relates to the control means for starting firing, means are provided for starting firing automatically at a range fixed in advance.

For this purpose, in particular, these means include (apparatus shown at 64 in Fig. 1):

On the one hand a device of the multivibrator or other type capable of supplying, after every transmitted pulse, a signal after a time (which may be adjustable) corresponding to the chosen distance (for instance after 8 microseconds for firing at 1200 meters), And, on the other hand, a coincidence electronic device, influenced both by the signals thus obtained and by the echo pulses, this device being adapted to be excited and thus to start firing only when the echo pulse arrives at the same time as said signal.

Figure 8:
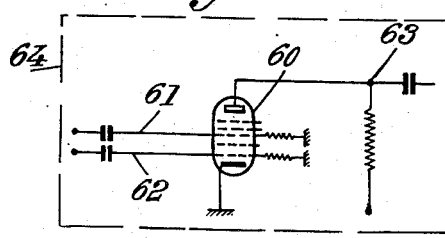
Fig. 8 is a diagram of an automatic firing control device according to my invention.

Such an electronic system is illustrated by Fig. 8 where it is constituted by a pentagrid tube to two of the grids of which (control and/or suppressor grids) the signal and the echo pulse are applied, at 61 and 62, whereas the other grids are biased in such manner that the tube supplies current only when the two voltages are applied simultaneously.

The impulse collected at 63 at the anode can be used either directly for controlling the apparatus which start firing (or any other apparatus which may be brought into play for fire control), or indirectly, in particular for triggering into operation a disymmetrical multivibrator system in order to obtain, if necessary, a longer signal.

My plant has, among other advantages,

That of ensuring full automaticity in laying the arm and starting the firing thereof, And that of ensuring both look out and automatic following operation, by means of very simple aerials and with a high accuracy.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A radio device for spotting and automatically following a movable target which comprises, in combination, a first tracking unit including a space scanning directional antenna array and means responsive to electromagnetic signals received by said antenna array from said target for automatically laying said antenna array on said target and keeping it laid thereon, a second tracking unit including a space scanning directional antenna array of smaller angular scanning field but of higher location accuracy than said first mentioned antenna array and means responsive to electromagnetic signals received by said last mentioned antenna array for keeping said last mentioned antenna array laid on said target, means for making said second tracking unit inoperative as long as said first mentioned means have not laid said first mentioned antenna array on said target, means interposed between said first mentioned antenna array and said second mentioned antenna array for laying said second one in accordance with the laying displacements of the first one, and means for automatically making said first mentioned tracking unit inoperative and said second mentioned tracking unit operative in response to the laying of the first mentioned antenna array on the target.

2. A radio device for spotting and automatically following a movable target which comprises, in combination, a first tracking unit including means for transmitting radio pulses, a space scanning directional antenna array and means responsive to echo pulses received by said antenna array from said target for automatically laying said antenna array on said target and keeping it laid thereon, a second tracking unit including a space scanning directional antenna array of smaller angular scanning field but of higher location acuracy than said first mentioned antenna array and means responsive to echo pulses received by said last mentioned antenna array from said target for keeping said antenna array laid on said target, means for making said second tracking unit inoperative as long as said first mentioned means have not laid said first mentioned antenna array on said target, means interposed between said first mentioned antenna array and said second mentioned antenna array for laying said second one in accordance with the laying displacements of the first one, and means for automatically making said first mentioned tracking unit inoperative and said second mentioned tracking unit operative in response to the laying of the first mentioned antenna array on the target.

3. On a machine fitted with a firearm, a radio device for spotting and automatically following a movable target for said firearm which comprises, in combination, a first tracking unit including means for transmitting radio pulses, a space scanning directional antenna array and means responsive to echo pulses received by said antenna array from said target for automatically laying said antenna array on said target and keeping it laid thereon, a second tracking unit including a space scanning directional antenna array of smaller angular scanning field but of higher location accuracy than said first mentioned antenna array, a receiver mounted to cooperate with said last mentioned antenna array and means responsive to echo pulses from said target collected by said receiver for keeping said second mentioned antenna array laid on said target, means for making said second tracking unit inoperative as long as said first mentioned means have not laid said first mentioned antenna array on said target, means interposed between said first mentioned antenna array and said second mentioned antenna array for laying said second one in accordance with the laying displacements of the first one, means for automatically making said first mentioned tracking unit inoperative and said second mentioned tracking unit operative in response to the laying of the first mentioned antenna array on the target, and means connected with said pulse transmitting means for producing in said receiver, in response to the transmission of a pulse, a blocking signal capable of preventing echo pulses from projectiles fired from said firearm and still close to said machine from acting on said receiver.

HENRI GEORGES DE FRANCE.

References Cited in the file of this patent

UNITED STATES PATENTS

| Number | Name | Date |
| --- | --- | --- |
| 2,406,316 | Blumlein | Aug. 27, 1946 |
| 2,409,448 | Rost | Oct. 15, 1946 |
| 2,412,111 | Wilson | Dec. 3, 1946 |
| 2,415,094 | Varian | Feb. 4, 1947 |
| 2,416,088 | Deerhake | Feb. 18, 1947 |
| 2,416,333 | Lehmann | Feb. 25, 1947 |
| 2,420,334 | White | May 13, 1947 |
| 2,421,018 | De Rosa | May 27, 1947 |
| 2,422,333 | Bedford | June 17, 1947 |
| 2,422,334 | Bedford | June 17, 1947 |
| 2,446,024 | Porter | July 27, 1948 |
| 2,455,673 | Hansell | Dec. 7, 1948 |
| 2,472,136 | Whitlock | June 7, 1949 |
| 2,473,175 | Ridenour | June 14, 1949 |
| 2,499,349 | Ayres | Mar. 7, 1950 |
| 2,507,211 | Manke | May 9, 1950 |
| 2,513,279 | Bradley | July 4, 1950 |
| 2,514,617 | Albersheim | July 11, 1950 |
| 2,556,673 | Budenbom | June 12, 1951 |